(12) United States Patent
Colinet et al.

(10) Patent No.: US 8,271,218 B2
(45) Date of Patent: Sep. 18, 2012

(54) NEAR FIELD REMOTE MEASUREMENT ARCHITECTURE FOR REMOTE PASSIVE {R, L, C} TYPE SENSOR

(75) Inventors: Eric Colinet, Meylan (FR); Michel Nowak, Grenoble (FR); Nicolas Delorme, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 190 days.

(21) Appl. No.: 12/744,554

(22) PCT Filed: Nov. 26, 2007

(86) PCT No.: PCT/FR2007/052401
§ 371 (c)(1),
(2), (4) Date: May 25, 2010

(87) PCT Pub. No.: WO2009/068758
PCT Pub. Date: Jun. 4, 2009

(65) Prior Publication Data
US 2010/0250167 A1 Sep. 30, 2010

(51) Int. Cl.
*G01R 27/00* (2006.01)
*G06F 19/00* (2011.01)
(52) U.S. Cl. .......................................... 702/65
(58) Field of Classification Search .................... 702/65; 73/579, 703, 724; 310/313 R, 313 B; 324/654–657
See application file for complete search history.

(56) References Cited

U.S. PATENT DOCUMENTS

| | | |
|---|---|---|
| 3,576,554 A | 4/1971 | Temps |
| 6,579,235 B1 | 6/2003 | Abita et al. |
| 7,377,168 B2 * | 5/2008 | Liu .................................. 73/579 |
| 2005/0007239 A1 | 1/2005 | Woodard et al. |
| 2006/0124740 A1 | 6/2006 | Woodard et al. |
| 2010/0148749 A1 * | 6/2010 | Leconte et al. .................. 324/72 |

OTHER PUBLICATIONS

U.S. Appl. No. 13/003,389, filed Jan. 10, 2011, Le Blanc, et al.
International Search Report issued Jan. 16, 2009 in PCT/FR07/52401 filed Nov. 26, 2007.
Colinet, E. et al., "Identification of a one-bit lowpass sigma-delta modulator using BIMBO", Instrumentation and Measurement Technology Conference—IMTC, pp. 437-440, XP002508729, ISBN: 1-4244-0588-2, (May 2007).

(Continued)

*Primary Examiner* — Sujoy Kundu
(74) *Attorney, Agent, or Firm* — Oblon, Spivak, McClelland, Maier & Neustadt, L.L.P.

(57) ABSTRACT

A reader device (104) for a contactless remote measurement system by inductive coupling provided with at least one RLC passive sensor (102) having a resistance and a capacitance or inductance provided for varying depending on one or more physical parameters, the measurement of which is desired, the reader including an inductive antenna (105), and means for iterative identification of at least the resistance and the capacitance or inductance of said sensor, provided for carrying out an iterative identification method comprising steps consisting of:
  emitting a test signal at the input of said antenna,
  achieving an estimation $\hat{y}_k$ of the time response of the sensor to said test signal with means forming a discrete filter (112) provided with coefficients which may be modulated,
  adapting the coefficients of the discrete filter, depending on a criterion J depending on said estimation and on a discrete signal $s_k$ formed from a real signal taken at the terminals of the antenna in response to the emission of said test signal.

15 Claims, 6 Drawing Sheets

OTHER PUBLICATIONS

Butler, C. John et al., "Wireless passive resonant circuit, inductively coupled, inductive strain sensor", Sensors Actuators A Physical, vol. 102, No. 1/2, pp. 61-66, (Dec. 2002).

Ong, K.G. et al., Monitoring of bacteria growth using a wireless, remote query resonant-circuit sensor: application to environment sensing, Biosensors & Bioelectronics, vol. 16, No. 4/5, pp. 305-312, (Jun. 2001).

English, M. Jennifer et al. "Wireless Micromachined Ceramic Pressure Sensors", In Proc., 12th IEEE Int., Mems Conf., Tech., Dig., pp. 511-516, (1999).

Husak, Miroslav: "One-chip integrated resonance circuit with a capacitive pressure sensor", J. Micromech., Microeng., vol. 7, No. 3, pp. 173-178, (Sep. 1997).

Coosemans, J. et al., "A Readout Circuit for an intra-ocular pressure sensor", Sensors Actuators A Physical vol. 110, No. 1-3, pp. 432-438, (2004).

Sajeeda and Todd J. Kaiser: "Passive Telemetric Readout System", IEEE Sensors Journal, vol. 6, No. 5, p. 1340-1345, (Oct. 2006).

Juillard, J. et al., "Self-Testing of Sigma-delta MEMS Sensors Using BIMBO", MWCAS/NEWCAS, 4 pages, (Aug. 2007).

Lizon-Martinez, Santiago et al., "Design of a System for Continuous Intraocular Pressure Monitoring", IEEE Transactions on Instrumentation and Measurement, vol. 54, No. 4, p. 1534-1540, (Aug. 2005).

Nabipoor, M. et al., "A new passive telemetry LC pressure and temperature sensor optimized for TPMS", Journal of Physics: Conference Series, vol. 34, p. 770-775, (2006).

Kim, Soon Young et al., "A Telemetry Silicon Pressure Sensor of LC Resonance Type", Proceedings of SPIE, vol. 4408, p. 452-461, (2001).

* cited by examiner

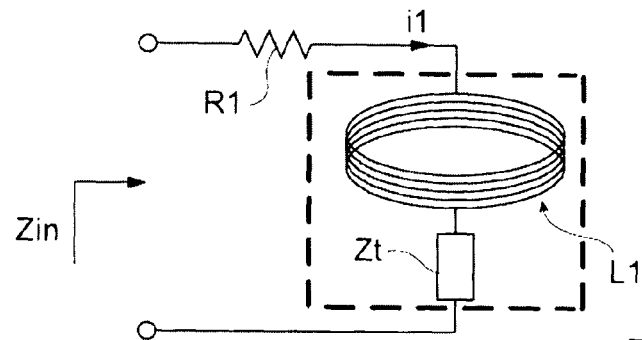
FIG. 3
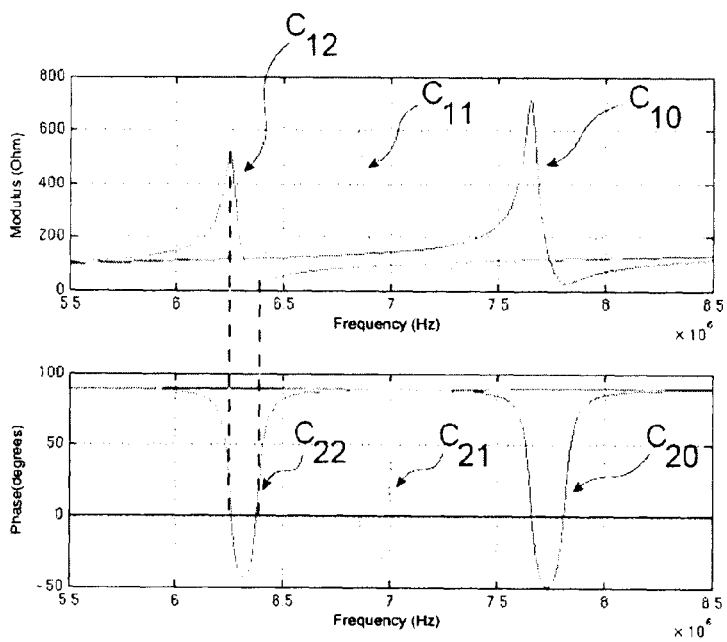
FIG. 4A
FIG. 4B

NEAR FIELD REMOTE MEASUREMENT ARCHITECTURE FOR REMOTE PASSIVE {R, L, C} TYPE SENSOR

TECHNICAL FIELD

The invention relates to the field of remote measurement or wireless measurement systems, provided with at least one passive sensor of the RLC type, in order to conduct measurements of physical quantities such as pressure, humidity, temperature, mechanical stress.

The invention relates to a remote measurement system, provided with at least one reader provided for acquiring and processing signals of at least one passive sensor of the RLC type, the reader applying an evaluation of the parameters R, L, C of said sensor by means of a method called BIMBO (Basic Identification Method using Binary Observations).

The invention finds applications in many industrial, medical or commercial fields for which wireless measurement is preferable or required, e.g. for measuring weather conditions such as pressure, humidity, temperature, inside a closed compartment, and/or for measuring mechanical stress.

With the invention it is possible to conduct simultaneous measurement of several physical parameters, and it also provides improvements in terms of production cost and of bulkiness of the reader, and is adapted to simultaneous reading of several sensors.

STATE OF THE ART

Among telemetric or wireless measurement systems, so-called <<active telemetry>> systems and <<passive telemetry>> systems are distinguished.

Passive telemetry systems comprise sensors which are described as passive and which generally do not have any power source or generator. Passive sensors may also be without any electronic processing circuit.

A reader device associated with the passive sensor is also provided. The sensor may provide measurement information to the reader device by inductive coupling by means of an inductive antenna.

Sensors of the {R,L,C} type are listed among existing passive sensors by inductive coupling. For this type of sensor, the measurement principle may be based on inductance changes as this is described in document [1] (referenced at the end of the present description in the same way as for all the cited documents), and/or on resistance changes as in document [2] and/or on capacitance changes as in documents [3] and [4], changes caused by changes in one or more physical parameters of interest, the measurement of which is desired, such as for example a temperature, a humidity rate, a pressure, a mechanical stress.

In {R,L,C} type sensors, variations of inductance and/or resistance and/or capacitance cause modification of the resonance frequency of the sensor, which may be remotely detected via an antenna of the reader device inductively coupled to the antenna of the {R,L,C} sensor.

By utilizing the magnitude and phase information of the spectrum of the impedance taken at the terminals of the antenna of the reader device, it is possible to detect the variations of the resonance frequency of the remote sensor and thereby obtain a picture of the variations of the physical quantity, the measurement of which is desired. Such a detection principle is shown for example in document [5].

An exemplary telemetry system is illustrated in FIG. 1. It comprises a wireless passive sensor 2 of the {R,L,C} type, modeled by an equivalent RLC circuit. The sensor 2 is provided with means forming an inductance $L_s$, with means forming a resistance Rs, with means forming a capacitance Cs capable of varying depending on physical parameters $p_i$, $p_j$, $p_k$.

A reader 4 notably including an inductive antenna 5 having an inductance $L_1$ and means forming a generator 6, is also provided for generating an alternating current $i_1$ in the antenna of inductance $L_1$ and giving rise to an electromagnetic field. When the sensor 2 is placed in the near field, i.e. in the area in proximity to the reader 4 where the magnetic field is predominant, inductive coupling occurs between the inductance $L_1$ of the reader 4 and of the inductance $L_s$ of the sensor 4.

Subsequently, via this coupling, a current $i_2$ is induced into the sensor 2, which has the consequence of drawing energy from the reader 4. This phenomenon is expressed by a voltage drop at the terminals of the inductive antenna 5, which may be modeled by an impedance, a so-called <<returned impedance>>. This returned impedance, called $Z_T$, corresponds to the influence of the sensor which has been returned at the level of the reader antenna. The induced amount of current $i_2$ flowing in the sensor 2 increases when the magnetic field frequency is close to the resonance frequency of the RLC circuit formed by the resistance Rs, the capacitance Cs and the inductance $L_s$, then causing an increase in the returned impedance $Z_T$. Also, when the transmission frequency is shifted away from the resonance frequency of the sensor, the returned impedance $Z_T$ decreases before again increasing with the excitation frequency. The variations of the returned impedance $Z_T$ are governed by the following equation (1):

$$Z_T = \frac{\omega^2 M^2}{\left(j\omega L_s + R_s + \frac{1}{j\omega C_s}\right)} \quad (1)$$

Examples of curves $C_1$, $C_2$ of frequency responses of the modulus and of the phase of the impedance $Z_T$ are given in the FIG. 2 for examples of values of components of the sensor 2 and of the reader 4 given in the table hereafter. The case of a sensor is considered in this example, where the environmental quantity has little influence on the value of $L_s$.

| | |
|---|---|
| Inductances of the reader and of the sensor $L_1$, $L_s$: | 2.7 µH |
| Inductances of the reader and of the sensor $L_1$, $L_s$: | 2.7 µH |
| Rated value of the coupling coefficient k: | 0.2 |
| Rated value of the capacitance $C_s$ of the sensor: | 180 pF |
| Rated value of the resistance Rs of the sensor: | 1Ω |

An equivalent diagram of the telemetry system is given in FIG. 3. The input impedance $Z_{IN}$ as seen by the inductance $L_1$ of the reader 4 may be written as a function of the electric quantities of the sensor 2 and of the mutual inductance M in the following way:

$$Z_{IN} = R_1 + jL_1\omega + \frac{\omega^2 M^2}{R_s + j\left(L_s\omega - \frac{1}{C_s\omega}\right)} \quad (2)$$

In FIGS. 4A and 4B, exemplary curves $C_{10}$, $C_{11}$, $C_{12}$ of frequency change and $C_{20}$, $C_{21}$, $C_{22}$, of phase change of the impedance $Z_{IN}$ of a remote measurement system, versus the change in its capacitance $C_s$ are given, for a resistance value Rs of the order of 1Ω, capacitance values of 160 pF (curves $C_{10}$ and $C_{20}$), 180 pF (curves $C_{11}$ and $C_{21}$), and 220 pF (curves $C_{12}$ and $C_{22}$), respectively.

In FIGS. 4C and 4D exemplary curves $C_{30}$, $C_{31}$, $C_{32}$, $C_{33}$ of frequency change and $C_{40}$, $C_{41}$, $C_{42}$, $C_{43}$ of phase change of the impedance $Z_{IN}$ of another remote measurement system, versus the variation of its resistance $R_s$ are given, for a capacitance value Cs of the order of 180 pF and resistance values of 1Ω (curves $C_{30}$ and $C_{40}$), 2Ω (curves $C_{31}$ and $C_{41}$), and 3Ω (curves $C_{32}$ and $C_{42}$), and 4Ω (curves $C_{33}$ and $C_{43}$) respectively.

The different values shown correspond to extreme and quiescent values of the sensor 2. The impedance $Z_{IN}$ has two distinct resonance frequencies characterized by zero-crossing in the plot of the phase. Both of these frequencies $f_p$ and $f_s$ are called parallel resonance frequency $f_p$ and series or anti-resonance frequency $f_s$, respectively.

Both of these frequencies $f_p$ and $f_s$ depend on the coupling coefficient k, so that $$\frac{f_p}{f_s} = \sqrt{(1-k^2)} \quad (4)$$

When the resistance $R_s$ of the remote sensor decreases, the amplitude of the modulus of $Z_{IN}$ increases proportionally according to equation (2). When the excitation frequency of the reader device is different from the resonance frequency of the device {Rs, Ls, Cs}, the effects of the variation of $R_s$ are less visible, as this is shown in FIGS. 4C and 4D.

Thus, by having the frequency change of the input impedance $Z_{IN}$, it is possible to trace back the values of interest, i.e. Rs, Cs and k with the knowledge of the other parameters.

There exist different architectures of reader devices for signals delivered by such a type of RLC sensor.

These architectures implement a measurement of the resonance frequency of the remote sensor and generally make use of the principle of the returned impedance.

According to a first elementary architecture example (FIG. 5), the frequency spectrum at the terminals of the antenna 15 of the reader 14 is recorded via an impedance analyzer 16, which may be controlled by a computer. The frequency spectrum of the sensor 12 is obtained by using a routine for subtracting the intrinsic impedance L of the reader antenna obtained by a measurement without the presence of the sensor. The resonance frequency of the sensor may be obtained by measuring a phase shift by using an impedance analyzer or by using a network analyzer.

With such an architecture, it is possible to remotely measure a variation of resonance frequency due to a change in capacitance or inductance. Subsequently to calibration, it is also possible to measure a resistive variation. Such a measurement method has the drawback of requiring a bulky device, of requiring calibration and requiring the intervention of a person for carrying out this calibration.

A so-called <<grid-dip>> architecture, as for it, allows detection of the resonance frequency of an LC type sensor. It comprises a variable frequency oscillator connected to an inductance and which detects the operating frequency of other oscillators or tuned circuits. A simple high frequency oscillator with variable frequency is provided for sweeping through a certain range of frequencies. When an LC type sensor is present in the near field area, a portion of the signal emitted by the oscillator is absorbed by the sensor. The amount of absorbed power is maximal when the frequency of the oscillator corresponds to the resonance frequency of the sensor. The measurement consists of displaying on an oscilloscope the sweeping frequency of the oscillator relatively to the emitted power in order to detect the change due to passing through the resonance frequency of the sensor.

An exemplary <<grid-dip>> remote measurement system is given in FIG. 6. The reader 24 comprises a function generator or a voltage-controlled oscillator (VCO) 26 with which a frequency sweep may be carried out. The amplitude of the voltage at the terminals of the antenna 25 of the reader device 24 is picked up with an envelope detector 27 so as to detect the resonance of the sensor 22. The signal for controlling the VCO 26 may be generated with a digital/analog converter 23, while an analog/digital converter 29 may be provided at the output of the envelope detector. The impedance of the antenna inductance 25 passes through a maximum when the frequency of the oscillator 26 corresponds to the resonance frequency. An exemplary implementation in discrete components of such an architecture is proposed in document [6].

An alternative embodiment of such a remote measurement system, provided for measuring pressure, is given in FIG. 7. The reader device operates according to a similar principle but this time uses phase shift information at the terminals of the antenna inductance 35 of a reader 34.

This reader 34 comprises a function generator or a voltage-controlled oscillator (VCO) 36. A phase detector 37 enables detection of the resonance of the sensor 22, while an amplitude detector 38 is located at the output of the phase detector 37. The signal for controlling the VCO 36 may be generated with a generator 41 of signals commonly called <<burst>> signals, a sampler 40 also enables a switch 42 to be controlled, located at the output of the amplitude detector and at the input of an analog/digital converter 39.

The architectures which have just been given allow remote detection of one or more resonance frequencies. The resolution and the range of detectable resonance frequencies depend on the accuracy of the voltage-controlled oscillators used. After calibration, it is also possible to measure at a set resonance frequency, a variation of resistance of the sensor.

Different reader device architectures are given in document [7]. They require the use of laboratory apparatuses and in certain cases require interfacing with a computer in order to obtain an exploitable measurement.

Most of these architectures also have a polyvalency problem, insofar that for example in order to conduct a joint measurement of weather quantities such that the temperature and humidity respectively correspond to a variation of resistance and to a variation of capacitance at the sensor, one of the two quantities has to be set before conducting a measurement or else two distinct reader devices have to be used, a first reader device being dedicated to measurement of resistive variation and a second reader device being dedicated to a measurement of capacitive variation.

The problem is posed of finding a novel reader device suitable for identifying parameters of an RLC type passive sensor, which does not include the drawbacks mentioned above.

DISCUSSION OF THE INVENTION

The present invention relates to a reader device for a contactless remote measurement system by inductive coupling, provided with at least one passive sensor of the RLC type having at least one resistance and one capacitance and/or one inductance, provided in order to vary depending on one or more physical parameters the measurement of which is desired, the reader including:

at least one inductive antenna, means for iterative identification of at least the resistance and the capacitance and/or the inductance of said sensor, provided in order to carry out an iterative identification method comprising steps of:

emitting at least one signal which will be called a <<test signal>> at the input of said antenna, performing an estimation $\hat{y}_k$ of the time response of the sensor to said test signal with means forming a discrete filter provided with coefficients which may be modulated, adapting the coefficients of the discrete filter, according to a criterion J at least depending on said estimation $\hat{y}_k$ and on a discrete signal $s_k$ formed from an actual signal taken at the terminals of the antenna in response to the emission of said test signal.

The discrete filter is thus a reconfigurable filter, the coefficients of which are adjusted gradually during the iterations of said method.

The order of the discrete filter may also be changed and adapted depending on said sensor.

The discrete filter may be provided with an order greater than or equal to that of the tested system illustrated by the sensor.

With such a device, simultaneous identification of the parameters of the sensor may be carried out.

The discrete signal $s_k$ may be formed by sampling and comparison of said response signal with a threshold.

The criterion $J=J_0$ may be calculated with the following expression:

$$J_0(\theta) = \sum_{k=1 \ldots N} (s_k - S(\hat{y}_k))^2 \hat{y}_k^2,$$

with $\theta=\{a_i; b_i\}$, $s_k=S(y_k)$ wherein S( ) is a function produced by a converter, for example a sign function and N is a number of samples.

S may be the function produced by an analog/digital converter. In the case of a 1 bit ADC converter of the comparator or relay type with hysteresis, S may be the sign function.

According to an alternative, a criterion $J=J_1$ may be calculated with the following expression:

$$J_1(\theta) = \sum_{k=1 \ldots N} (s_k - S(\hat{y}_k))^2$$

Such a criterion is piecewise continuous, and may be used as a condition for stopping the iteration algorithm.

Adaptation or modification of the coefficients of the discrete filter may comprise steps of:

performing an evaluation of new filter coefficients, calculated so as to minimize the criterion J, replacing the coefficients of the filter with said new coefficients obtained by said evaluation.

The reader may comprise calculation means, provided, at the end of the iterative method, for:

acquiring the coefficients of the filter, performing an evaluation of at least the resistance Rs, and the capacitance Cs and/or the inductance Ls of the sensor.

The end of the iterative method may be reached when a predetermined number of iterations N_threshold_1 has been reached.

The end of the iterative method may also be reached when a predetermined value of the criterion J is reached or when J is less than or equal to a predetermined value J_threshold_2.

At the end of the iterative method, final coefficients $a_i=a_p$, $b_i=b_p$ of the filter are obtained.

According to one possibility, the identification means may further be provided in order to evaluate the value of the mutual inductance M between the sensor and the reader. With this it is possible to obtain the distance separating the inductive antenna of the sensor from that of the reader device.

In a case when the discrete filter is of the same order as the discrete equivalent of the real tested system: the calculation means are implemented so as to obtain analytically a series of expressions relating the coefficients of the obtained discrete filter to the elements Cs, Rs and M (Ls is assumed to be known).

In a case when the discrete filter is of a higher order than the discrete equivalent of the real system, a calculation of the modulus of the obtained filter by means of the final coefficients for different frequencies of a given frequency band may be carried out. The given frequency band may be the operating frequency band of the RLC filter. The modulus may be calculated, after having switched from a discrete domain to a continuous time domain.

A resonance frequency $f_0$ may be determined by detecting a frequency for which a maximum of the modulus is reached. Knowing Ls and the resonance frequency $f_0$, it is possible to obtain the capacitance Cs. An anti-resonance frequency $f_1$ may be determined by detecting a frequency for which a minimum is reached. A value of M may then be inferred from the following expression:

$$\frac{f_0}{f_1} = \sqrt{(1-k^2)}.$$

Finally, a value of Rs is related to the quality coefficient of the remote system: knowing Cs, Ls and the resonance frequency $f_0$, Rs may be calculated with the following expression:

$$Rs = \frac{2\pi f_0 Ls}{Q}$$

with $$Q = \frac{\Delta f}{f_0},$$

with $\Delta f$ the swept pass-band.

By providing a filter of a higher order than the order of the tested system, for which determination of the parameters is desired, it may be possible to obtain faster convergence of the minimization algorithm, in particular in a case when the implemented algorithm is of the Neldermead type.

The test signal may be a noise signal, in particular a white noise signal, the generator means in this case comprising a noise generator, in particular a white noise generator.

The noise generator may comprise a 1 bit digital/analog converter.

The discrete signal $s_k$ may be an output signal of comparator means receiving said real response signal at the input.

The comparator means may be formed with a 1 bit analog/digital converter. The use of a 1 bit analog/digital converter may allow minimization of the noise in the measurement chain.

The generator means may comprise a power amplifier, the power of which is capable of being modulated by power control means forming a feedback loop.

The power control means may be provided for adapting the power of the signal emitted by the generator means depending on a comparison between a predetermined mutual inductance value and a mutual inductance value evaluated by the identification means of the reader.

The invention also relates to a remote measurement system comprising:
an RLC type passive sensor,
at least one reader as defined above.

The invention also relates to a remote measurement system comprising:
two or more RLC type passive sensors,
at least one reader as defined above.

Thus, a reader implemented according to the invention may be provided for conducting a simultaneous measurement on several sensors, for example on different sensors intended for measuring different physical parameters, or on different sensors intended for measuring the same physical parameters but according to different ranges.

Means for changing the order of the discrete filter depending on the number of sensors used within the remote measurement system may also be provided.

SHORT DESCRIPTION OF THE DRAWINGS

The present invention will be better understood upon reading the description of given exemplary embodiments, purely as an indication and by no means as a limitation, with reference to the appended drawings wherein:

FIG. 1 illustrates a telemetry system by inductive coupling, including an RLC type passive sensor and a reader;

FIG. 2 gives exemplary curves of the modulus and phase of the returned impedance of an RLC type passive sensor;

FIG. 3 illustrates an equivalent diagram of an input impedance of an RLC type passive sensor, as seen by a reader in a telemetry system;

FIGS. 4A, 4B give exemplary curves of the modulus and phase of the input impedance of an RLC passive sensor for different capacitance values of the sensor;

FIGS. 4C, 4D give exemplary curves of the modulus and phase of the input impedance of an RLC passive sensor for different resistance values of the sensor;

The different portions illustrated in the figures are not necessarily illustrated according to a uniform scale, in order to make the figures more legible.

DETAILED DISCUSSION OF PARTICULAR EMBODIMENTS

Figure 1:
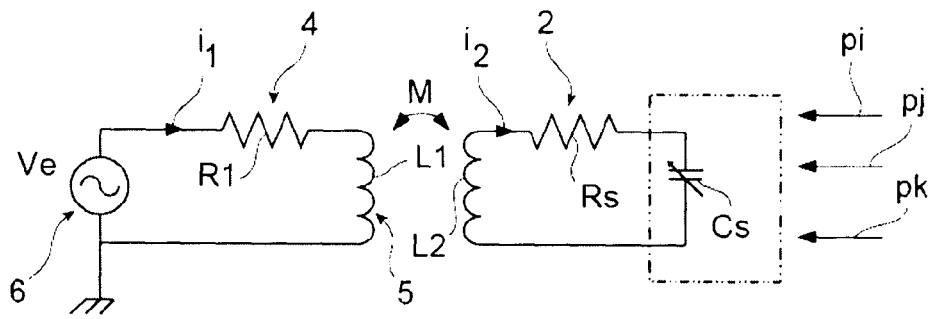
Figure 2:
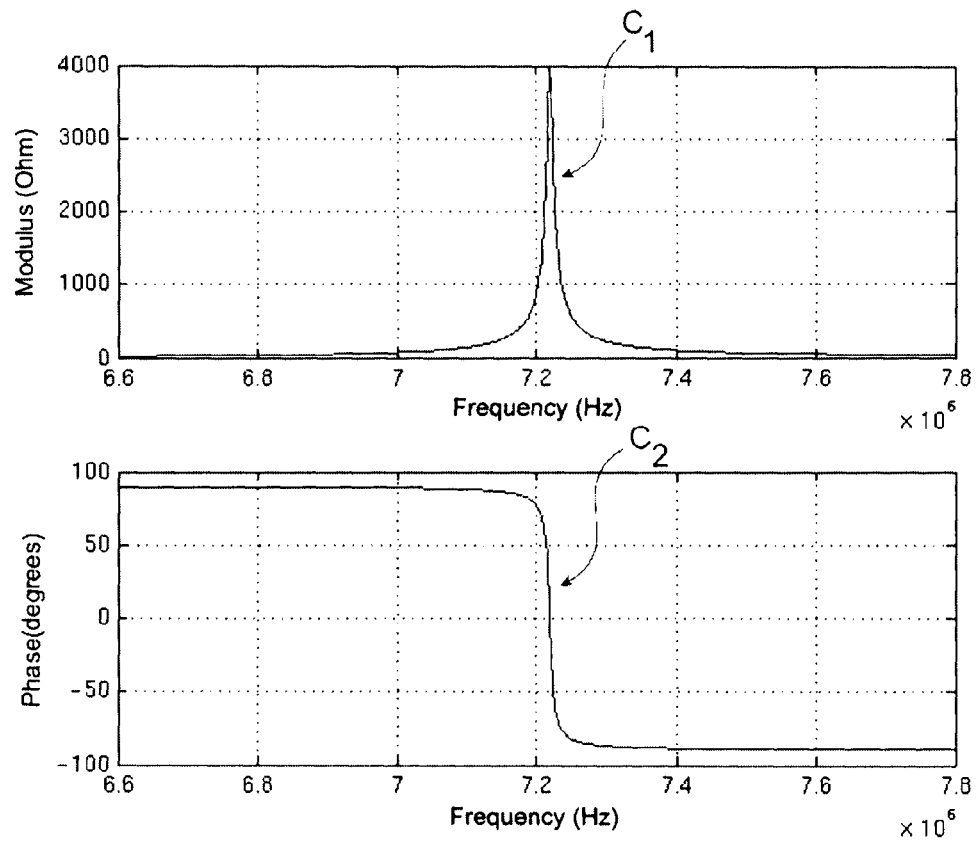
Figure 4C:
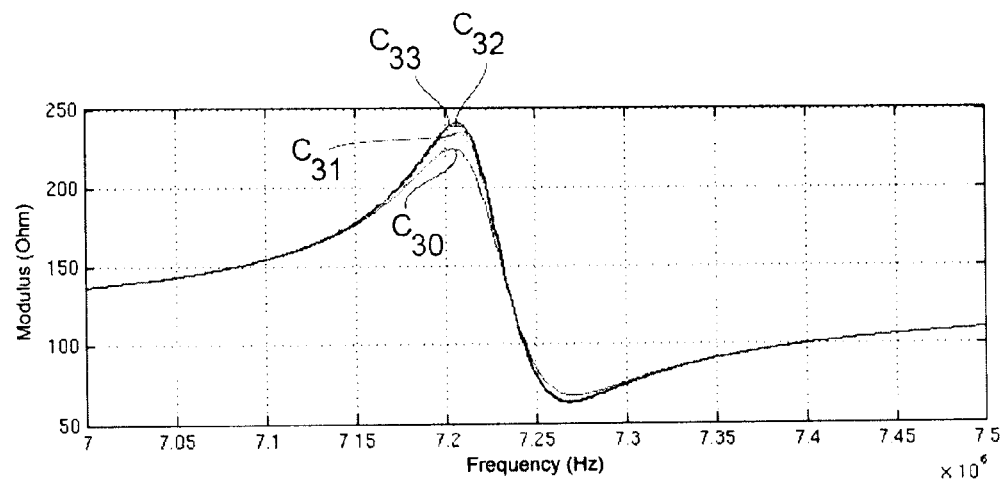
Figure 4D:
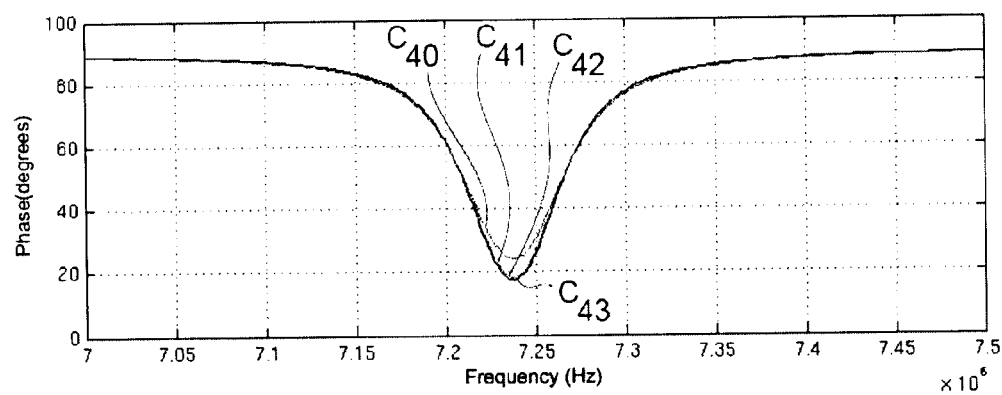
Figure 5:
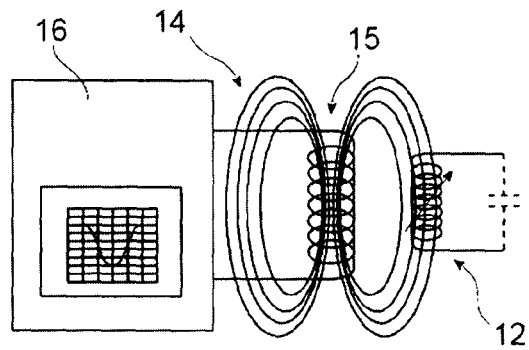
FIG. 5 illustrates a device by inductive coupling according to the prior art for reading measurements carried out by a magnetic permeability measurement sensor using an impedance analyzer.
Figure 6:
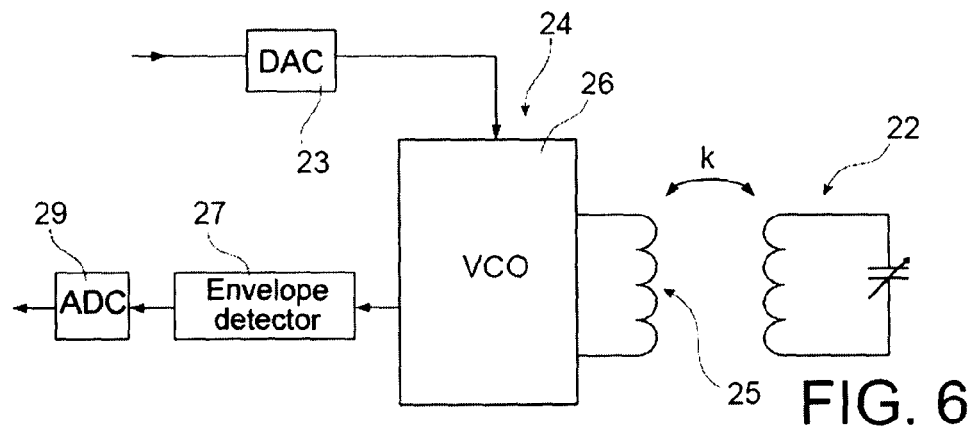
FIG. 6 illustrates an exemplary passive telemetry device according to the prior art, comprising a reader operating according to the so-called <<grid-dip>> principle.
Figure 7:
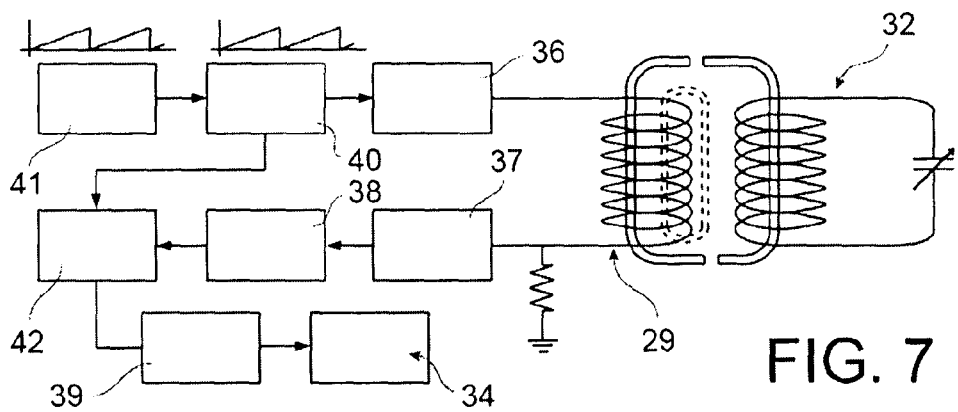
FIG. 7 illustrates another exemplary passive telemetry device according to the prior art comprising a reader operating according to the so-called <<grid-dip>> principle.

In FIG. 1, an exemplary passive telemetry system according to the invention is given. This system comprises a wireless passive sensor 102 of the {R,L,C} type, modeled by an equivalent RLC circuit.

The sensor 102 is provided with means forming a resistance Rs, means forming a capacitance Cs, means forming an inductance Ls, the capacitance Cs, the inductance Ls and the resistance Rs being capable of varying depending on physical parameters such as for example temperature, humidity, mechanical stress, the measurement of which is desired. The sensor 102 may for example be a sensor provided for carrying out a temperature and humidity measurement.

The telemetry system also comprises a reader 104 intended for reading signals from the sensor 102 and for producing, depending on the signals, estimations of the resistance Rs, of the capacitance Cs of the sensor, as well as the mutual inductance M between the sensor 102 and the reader device 104. The reader 104 notably includes an inductive antenna 105 with inductance $L_1$ and generator means provided for generating a current in the antenna 105 in order to give rise to an electromagnetic field.

The generator means may comprise a signal generator, provided for producing a signal rich in harmonics and which may be pseudo-random. The generated signal may be a signal rich in harmonics on a given frequency band, which may correspond to the pass-band or operating band of the sensor 102. The generator means may comprise a noise generator 108, in particular a white noise generator, at the output of which a power amplifier 106 may be provided delivering a current to the antenna 105. A filtering step may also be integrated to said generator means. The signal may be generated by means of a two-state signal, the generator 108 in this case including a digital/analog converter (DAC), for example a 1 bit DAC.

Means for acquiring the antenna signal 105 are provided. The reader 104 is capable of remotely measuring a resistive variation (i.e. a variation of Rs), an inductive variation (i.e. a variation of Ls) of the sensor 102, a capacitive variation, i.e. a variation of Cs, which is passive and of the {R,L,C} type, as well as a variation of mutual inductance M.

According to a possible embodiment, the sensor may have a fixed inductance Ls.

According to another possible embodiment, the inductance Ls of the sensor may be a variable quantity of interest, while the capacitance Cs of the sensor is fixed. A magnetostrictive or piezomagnetic sensor for example is capable of modifying its magnetic properties under the action of a mechanical stress, and may have a variable inductance Ls, while its capacitance Cs is fixed.

The reading may be carried out in real time and simultaneously between the different variables Rs, Cs, Ls, (or Cs/Ls), M read. A simultaneous measurement of several physical parameters may thus be obtained.

The reader 104 is notably provided for implementing an identification of different variables Rs, Cs, Ls, (or Cs/Ls), M, read, by means of a method of the BIMBO (Basic Identification Method using Binary Observations) type and as described in the documents "Self-testing of sigma-delta MEMS sensors using BIMBO", E. Colinet, J. Julliard, MWCAS/NEWCAS, August 2007 and "Identification of a one-bit lowpass sigma-delta modulator using BIMBO", E. Colinet, J. Julliard, Instrumentation and Measurement Technology Conference, May, 2007.

The sensor 102 is inductively coupled to the reader 104 and is considered as an unknown system, the order of which may be known, and for which evaluation of the variables Rs, Ls/Cs, and M is desired. An identification of the parameters characterizing this system is implemented by the reader 104. For this, an estimation of the transfer function characterizing the sensor 102 may be made. Via the reader 104, it is thereby possible to obtain an estimation of the remote capacitance Cs, inductance Ls and resistance $R_S$, but also of the measurement distance D, i.e. the distance of the sensor 102 relatively to the reader device 104 by extracting the value of the mutual inductance M at the applied inductive coupling.

The reader 104 may apply a method for identifying a system with which the values of interest Cs/Ls, Rs, M may be traced back from the estimation of the input impedance $Z_{IN}$, as seen by the inductance $L_1$ of the reader 104.

Such an identification method may be for example implemented with a digital signal processor (DSP), or with a microprocessor or with an FPGA circuit integrated into the reader 104.

Figure 8:
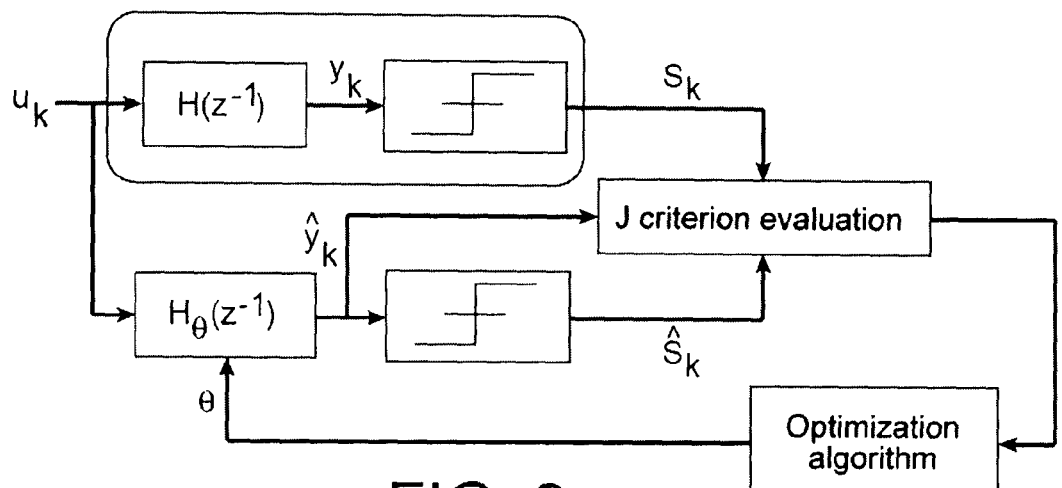
FIG. 8 illustrates, via an automatic control engineering block diagram, a method implemented by a reader according to the invention, for identifying variables of an RLC passive sensor.
Figure 9:
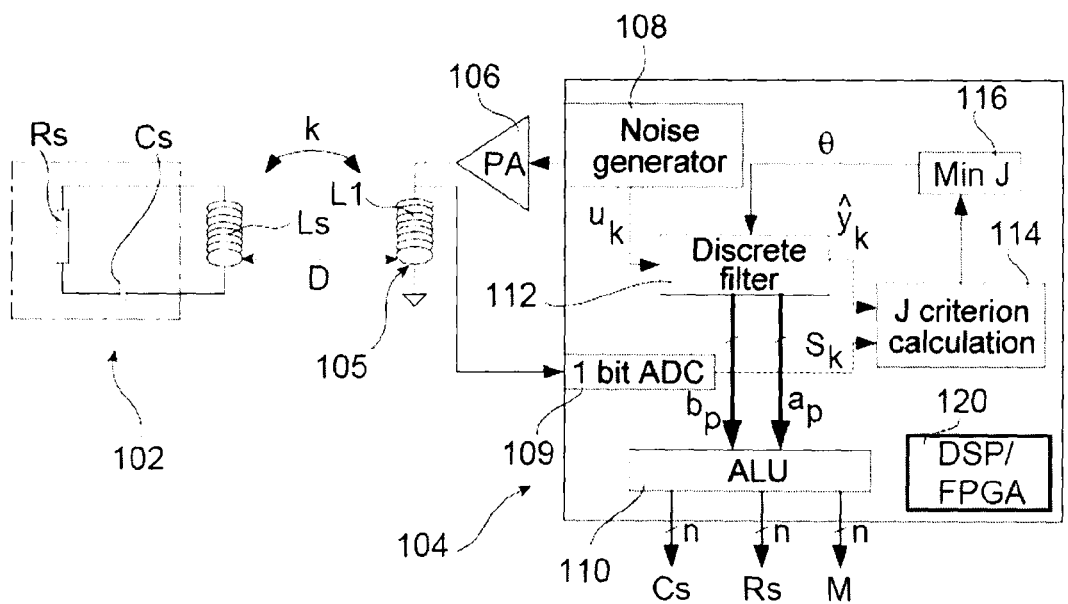
FIG. 9 illustrates an exemplary embodiment of a telemetry system according to the invention with an RLC type passive sensor and a reader of measurements carried out by the sensor.

An identification method principle applied by the reader will now be given in connection with FIGS. 8 and 9, FIG. 8 illustrating an equivalent automatic control engineering block diagram of the processing carried out, while FIG. 9 illustrates an exemplary remote measurement system according to the invention.

First of all, a spectrally rich signal $u_k$ such as a which noise, is generated with the generator 108. This signal may be generated by means of a two-state signal, the generator including, in this case for example, means forming a 1 bit DAC.

Next, the response signal $y_k$ of the remote measurement system is acquired. For this, signal acquisition is carried out at the terminals of the antenna 105, signal which is then injected into means 109 forming a comparator. The signal at the terminals of the antenna is sampled and compared with a threshold, in order to obtain a signal $s_k$ such that $s_k=S(y_k)$ with S( ) which may be the function produced by an analog/digital converter. In the case when the means 109 form a 1 bit DAC of the hysteresis relay or comparator type, S may be the sign function.

The application of a sign function or the comparison may be achieved for example by means forming a 1 bit analog/digital converter. By using a 1 bit analog/digital converter, the noise in the measurement chain may be minimized.

By applying a discrete parametric model $H(\theta)$ of the transfer function of the unknown system, an estimation $\hat{y}_k$ of the time response of the unknown system to the signal $u_k$ emitted by the generator 108, as well as its sign $\hat{S}_k = S(\hat{y}_k)$ is calculated. This operation may be performed by means forming a discrete filter 112, the order and coefficients of which are adjustable and may be adapted or modified.

The order of the discrete filter 112 is adapted depending on that of the tested system, represented by the sensor 102. The order of the discrete filter 112 may be provided to be equal to that of the tested system, or according to an alternative, may be greater than that of the tested system for which identification is desired.

The parametric model $H(\theta)$ representing the discrete filter 112, which is considered, may be of the following form:

$$H(\theta) = \frac{\sum_{k=0 \ldots nb} b_k z^{-k}}{1 + \sum_{k=0 \ldots na} a_k z^{-k}}$$

A variable $\theta = \{a_i; b_i\}$ is defined as being a set of unknown parameters characterizing the system for which identification is desired. The coefficients $a_i$ and $b_i$ may for example be set to 0 at the beginning of the identification method.

In a case when identification is performed on a single sensor 102, the expression of the parametric model of the filter may be such as the one given above, with as an example, na=5 and nb=5.

It is also possible to set the filter to a expected rated value corresponding for example to a quiescent state of the sensor, i.e. a state in which the parameters Rs, Ls, Cs, of the sensor are known and do not vary, the sensor in this quiescent state, not being subject to external actuations.

An algorithm for optimizing the coefficients $a_i$ and $b_i$ of the filter is then applied.

By successive iterations, the parametric model $H(\theta)$ of the filter 112 is adjusted by refining the coefficients $a_i$ and $b_i$, so as to correct the produced estimation $\hat{y}_k$ by means of the filter 112 and to thereby maximize the similarities between the signal $S_k$ and the estimation $\hat{S}_k = S(\hat{y}_k)$. Thus, the discrete filter 112 is reconfigurable, its coefficients $a_i$ and $b_i$ being gradually adapted or modulated during the successive iterations.

This adjustment is carried out by calculating a criterion J for which minimization is sought, which is function of $s_k$ which depends on the signal actually received by the antenna 105 and on the estimation $\hat{y}_k$, the criterion J may be defined with the following relationship:

$$J_0(\theta) = \sum_{k=1 \ldots N} (s_k - S(\hat{y}_k))^2 \hat{y}_k^2 \qquad (5)$$

with N: the number of samples to be processed and S(.) the relationship between the input and output of the comparator, for example the sign function produced by the 1 bit DAC 109.

According to an alternative, a criterion $J=J_1$ may be calculated with the following expression:

$$J_1(\theta) = \sum_{k=1 \ldots N} (s_k - S(\hat{y}_k))^2$$

Such a criterion is piecewise continuous, and may be used as a condition for stopping the iteration algorithm.

The calculation of the criterion J is carried out by calculation means 114.

Next, new coefficients $a_i$ and $b_i$ calculated so as to minimize the criterion J are determined. Means 116 are provided for determining the new coefficients of the filter 112, so as to obtain a minimum criterion J and to replace the current coefficients with the new coefficients.

After a certain number of iterations, final coefficients $a_p$ and $b_p$ of the estimated transfer function are obtained.

A first criterion for stopping the iterative method may be the achievement of a predetermined threshold number of iterations N_threshold_1. Once this number of iterations N_threshold_1 is reached, a calculation of the values Cs, Rs and M is performed from the obtained final coefficients $a_p$ and $b_p$.

A stopping criterion may also be to reach a predetermined given threshold value J_Threshold_2 of the criterion J, which may for example be of the order of 5% or 8%. Once this threshold value of (J_Threshold_2) is reached, a calculation of the values Cs, Rs and M is performed from the final coefficients $a_i$ and $b_i$.

From these coefficients $a_i$ and $b_i$, a computing unit 110, for example an arithmetic logic unit (ALU) is provided for determining values of capacitance Cs, of resistance Rs and of mutual inductance M, by knowing the value of the inductance $L_1$ of the reader 104 and possibly that of the inductance Ls of the sensor 102 when the latter is fixed or possibly the value of the capacitance Cs of the sensor 102 when the latter is fixed.

In a case when the discrete filter is of the same order as the discrete equivalent of the tested real system, the order of the tested system for which identification of the parameters Rs, M, Ls or Cs is intended, being known, the computing means 110 may be applied so as to obtain analytically a series of expressions relating the final coefficients $a_p$, $b_p$ of the obtained discrete filter to the elements Cs, Rs and M (Ls being assumed to be known) or Ls, Rs and M (Cs being assumed to be known).

In another case, when the discrete filter 112 is provided with a higher order than the discrete equivalent of the tested real system, the computing means 110 may be provided in order to apply a calculation of the modulus of the filter for which the coefficients are the final coefficients $a_p$ and $b_p$ of the reconfigurable parametric model obtained at the end of the iterative method, and this for a plurality of frequencies of a given frequency band. For this, switching from the discrete time domain to the continuous time domain may be carried out. The calculation may then be carried out for a plurality of frequencies of a frequency band or by sweeping through a frequency band corresponding to the pass-band or band of use of the RLC filter. The detection of a maximum of the modulus and of the associated frequency with which this maximum may be attained, may give the possibility of determining a resonance frequency $f_0$. For example by knowing the inductance Ls of the sensor 102 and the resonance frequency $f_0$, a calculation of the capacitance Cs may then be carried out.

The detection of a minimum of the modulus and of the associated frequency with which this minimum may be attained, may give the possibility of obtaining an anti-resonance frequency.

The value of M then results from equation $(\frac{f_0}{f} = \sqrt{(1-k^2)})$.

Finally, the value of Rs may be related to the quality coefficient or Q factor of the remote system: by knowing Cs, Ls and the resonance frequency $f_0$, Rs is calculated by:

$$Rs = \frac{2\pi f_0 Ls}{Q}$$

with $$Q = \frac{\Delta f}{f_0}$$

the swept frequency band.

The reader 104 may also comprise a power amplifier (PA) with which sufficient current may be generated into the emission antenna 105 of inductance $L_1$.

In this example, the reader 104 has a 1 bit DAC interface with which the sign function S( ) already mentioned may be produced. The digital transfer function filter $H_\theta$ corresponding to the parameterizable model plays the role of the discrete and unknown picture of the tested system.

The identification method achieved for example by a DSP or of an FPGA notably comprises the following operations:
  a pseudo-random signal is for example generated on 1 bit and over a wide spectrum of a determined band,
  next the operation for evaluating the measurement is performed, which notably includes the 2 following steps:
  calculation of the criterion J for example by means of the relationship (5) given above;
  evaluation of new coefficients of the filter 112 allowing minimization of this same criterion J and replacement of the current coefficients with new coefficients. This step may be performed for example with a minimization algorithm of the simplex or gradient type.

According to one possibility, a minimization algorithm of the Nelder-Mead type and as described for example in document: "Convergence Properties of the Nelder-Mead Simplex Method in Low Dimensions", Lagarias et al., SIAM Journal of Optimization, Vol. 9, No. 1, pp. 112-147, 1998.

According to another possibility, a gradient minimization or Newton-Raphson algorithm as described for example in <<An introduction to the conjugate Gradient Method without the agonizing pain>>, Edition 1 1/4 Jonathan Richard Shewchuck, School of Computer Science, Carnegie Mellon University, may be used.

The question is to approach as closely as possible the actual transfer function of the sensor 102. When this step is estimated to be satisfactory, by means of the N_Threshold_1, J_threshold_2 criteria and from the obtained values of the {ai,bi} coefficients of $H_\theta$, after having determined final coefficients $a_p$, $b_p$ after a certain number of iterations of the method, the parameters Cs, Rs and M are traced back by knowing $L_1$ and $L_s$. The $L_1$ and Ls values were able to be defined beforehand by means of a calibration step.

Figures 10, 11:
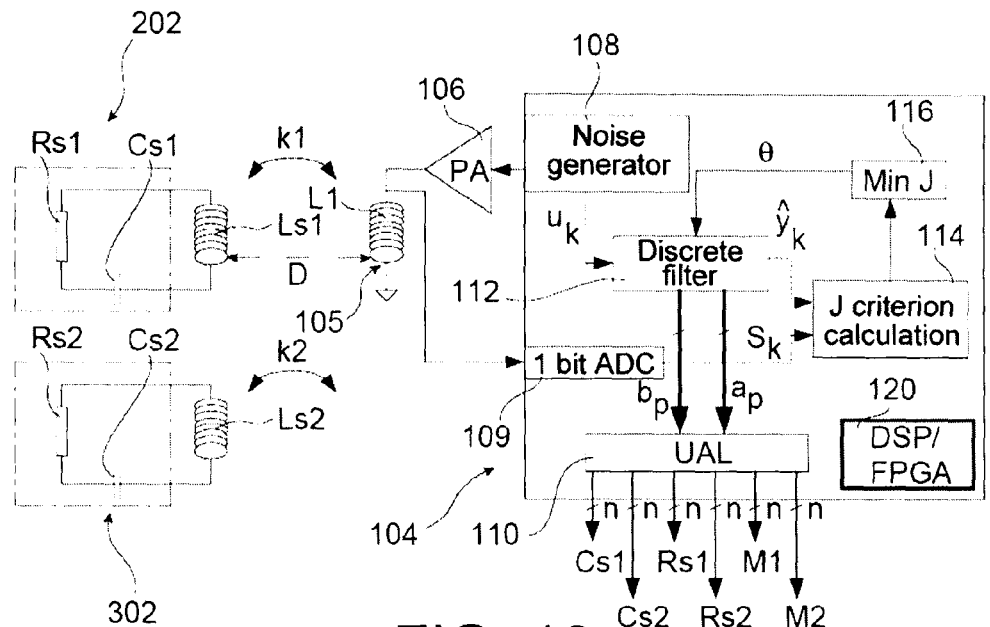
FIG. 10 illustrates another exemplary embodiment of a telemetry system according to the invention with several RLC type passive sensors and a reader of ranges of measurements respectively carried out by these sensors.
FIG. 11 illustrates an exemplary embodiment of a telemetry system according to the invention, comprising an RLC type passive sensor and a reader of the measurements carried out by the sensor, the reader being provided with a device for servo-control of its power amplifier.

A second exemplary remote measurement system according to the invention is shown in FIG. 10.

In this example, the system comprises several sensors, for example two sensors 202, 302 of the RLC type similar to the sensor 102 described earlier, respectively provided with means forming a resistance (noted as Rs1 for the first sensor 202 and Rs2 for the second sensor 302), with means forming a capacitance (noted as Cs1 for the first sensor 202 and Cs2 for the second sensor 302), the capacitance and the resistance being capable of varying depending on physical parameters, the measurement of which is desired, as well as a coupling inductance L.

A first sensor 202 may be provided for applying a measurement of one or more physical parameters, according to a first range, by means of the variation of its resistance Rs1 and of the capacitance Cs1, while the second sensor 302 may be provided for a measurement of one or more physical parameters by means of the variation of its resistance Rs2 and of its capacitance Cs2. The sensors respectively include an antenna of inductance Ls1 and an antenna of inductance Ls2, each placed opposite the reader 104. The two sensors 202 and 302 each have a resonance frequency which is specific to them, which for example varies with the range of the measured physical parameter.

The first sensor 202 may for example be a pressure sensor provided for measuring a first range of pressures, while the second sensor 204 is a pressure sensor provided for measuring a second range of pressures, different from the first range.

The BIMBO identification method described earlier is based on a parametric model and may be applied by means of a reconfigurable discrete filter 108, a picture of the tested device, i.e. of the device for which identification of the parameters is intended. The reconfigurable filter 112 may be adapted to identification with two sensors by changing the order of the filter. In the case of the two sensor application, the filter is dimensioned for a system having several resonances. The order to the filter may then be modified and increased relatively to identification with a single sensor as described earlier. In the case of the two sensor application, the expression of the parametric model of the filter may be given by the following equation with for example na=8 and nb=8.

$$H(\theta) = \frac{\sum_{k=0\ldots nb} b_k z^{-k}}{1 + \sum_{k=0\ldots na} a_k z^{-k}}$$

The BIMBO identification method gives the possibility of again finding the {ai,bi} coefficients of the discrete filter expressing the presence of resonance frequencies corresponding to both sensors 202, 302.

Another exemplary embodiment is given in FIG. 11.

A reader structure is considered, similar to the one described earlier in connection with FIG. 9, but with means for modulating the power of the power amplifier 106 of the reader 104, provided for modifying the emission power of the power amplifier 106 required for a reading operation. These means may be implemented by a feedback loop 320. Servo-control is achieved depending on a mutual inductance value M between the inductance $L_1$ of the reader and the inductance (or the inductances) of the sensor 102 (of the sensors respectively), estimated and compared with respect to a reference value noted Mref. According to this value, a control signal ctrl, which may be defined on several logic levels, is generated by means 321, for example by means of a combinatorial logic circuit or an FPGA or a microcontroller.

The power amplifier 109 is provided for modulating its power depending on the value of the ctrl signal.

An RLC sensor coupled to a reader device 104 as described above may operate without any maintenance operation in restricted and closed media such as high temperatures or radioactivity.

The invention finds applications in many industrial or commercial fields such as the agro-feeding industry, logistics, the oil industry, for which a wireless measurement is preferable or required, for example in restrictive media which have to remain closed such as media at high temperature, and/or radioactive, and/or in vacuo, and/or hermetically sealed, etc.

The invention also finds applications in the medical field, for example in remote measurement systems provided with a passive pressure sensor applied to the ocular domain.

CITED DOCUMENTS

[1]: J. C. Butler, A. J. Vigliotti, F. W. Verdi, and S. M. Walsh, "Wireless passive resonant circuit, inductively coupled, inductive strain sensor," Sens. Actuators A, Phys., Vol. 102, No. 1/2, pp. 61-66, December 2002.

[2]: K. G. Ong, J. Wang, R. S Singh, L. G Bachas, and C. A. Grimes, "Monitoring of bacteria growth using a wireless, remote query resonant-circuit sensor: Application to environment sensing," Biosens. Bioelectron., Vol. 16, No. 4/5, pp. 305-312, June 2001.

[3]: J. M. English and M. G. Allen, "Wireless micromachined ceramic pressure sensors," in Proc. 12th IEEE Int. MEMS Conf. Tech. Dig., 1999, pp. 511-516.

[4]: M. Husak, "One-chip integrated resonance circuit with a capacitive pressure sensor," J. Micromech. Microeng., Vol. 7, No. 3, pp. 173-178, September 1997.

[5]: K. Finkenzeller, RFID Handbook, Fundamentals and Applications in Contactless Smart cards and identification, $2^{nd}$ ed., J. Wiley, 2003.

[6]: J. Coosemans, M. Catrysse, R. Puers, "A readout circuit for an intra-ocular pressure sensor", Sens. Actuators A, Phys. Vol. 110, No. 1-3, pp. 432-438, 2004.

[7]: Sajeeda and T. J. Kaiser, "Passive Telemetric Readout System," IEEE Sensors Journal, Vol. 6, No. 5, October 2006.

The invention claimed is:

1. A reader device for a contactless remote measurement system by inductive coupling, provided with at least one passive sensor of the RLC type having at least one resistance, one capacitance and one inductance, the resistance, the capacitance or the inductance being provided so as to vary depending on one or more physical parameters, the measurement of which is desired, the reader device including:
   at least one inductive antenna,
   an identification device for iterative identification of at least the capacitance and the resistance of said sensor, provided in order to carry out an iterative identification method comprising steps of:
   emitting at least a test signal at the input of said antenna,
   achieving an estimation $\hat{y}_k$ of the time response of the sensor to said test signal with a discrete filter provided with adjustable coefficients,
   adapting the coefficients of the discrete filter, depending on a criterion J depending at least on said estimation $\hat{y}_k$ and on a discrete signal $s_k$ formed from an actual signal taken from the terminals of the antenna in response to the emission of said test signal.

2. The reader device for a contactless remote measurement system by inductive coupling according to claim 1, the filter having an adjustable order.

3. The reader device for a contactless remote measurement system by inductive coupling according to claim 2, wherein the discrete signal is formed by sampling and comparison of said response signal with a threshold.

4. The reader device for a contactless remote measurement system by inductive coupling according to claim 1, wherein the criterion J is calculated with the following expression:

$$J_0(\theta) = \sum_{k=1\ldots N} (s_k - S(\hat{y}_k))^2 \hat{y}_k^2,$$

with $\theta=\{ai;bi\}$, $s_k=S(y_k)$ wherein S is a sign function and N a number of samples.

5. The reader device according to claim 1, wherein the adaptation of the coefficients of the discrete filter, comprises steps of:
   achieving an evaluation of new coefficients of the filter with which the criterion J is minimized,
   replacing the coefficients of the filter with said new coefficients.

6. The reader device according to claim 1, comprising a calculation device for, at the end of the iterative identification method:
  acquiring the coefficients of the filter,
  achieving an evaluation of at least the resistance and, the capacitance and/or the inductance of the sensor.

7. The reader device according to claim 6, said end of the iterative method occurring:
  when the criterion $J_1$ is such that $J_1 \leq J\_threshold\_2$, with $J\_threshold\_2$ being a predetermined threshold or
  when a predetermined number of iterations $N\_threshold\_1$ of the iterative method is reached or
  when a predetermined number of iterations $N\_threshold\_1$ of the iterative method is reached and $J_1 \leq J\_threshold\_2$.

8. The reader device according to claim 1, wherein the test signal is a noise signal, the generator comprising a noise generator.

9. The reader device according to claim 8, wherein the noise generator comprises a 1 bit digital/analog converter.

10. The reader device according to claim 1, wherein the discrete signal $s_k$ is an output signal of a comparator receiving said real response signal at the input.

11. The reader device according to claim 10, the comparator being formed with a 1 bit analog/digital converter.

12. The reader device according to claim 1, the identification device being further provided in order to evaluate a mutual inductance coefficient between the sensor and the reader device.

13. The reader device according to claim 1, wherein the generator comprises a power amplifier, the power of the signal emitted by the generator being modulated by power adjustment device forming a feedback loop.

14. The reader device according to claim 13, wherein the identification device is provided for evaluating a mutual inductance coefficient between the sensor and the reader device, the power adjustment device being provided for adapting the power of the signal emitted by the generator depending on a comparison between a predetermined mutual inductance value and a mutual inductance value evaluated by the identification device of the reader.

15. A remote measurement system comprising:
  one or more passive sensors of the RLC type,
  at least one reader according to claim 1.

* * * * *